United States Patent [19]
Funato et al.

[11] Patent Number: 5,195,071
[45] Date of Patent: Mar. 16, 1993

[54] FOCUS DETECTING OPTICAL HEAD

[75] Inventors: Hiroyoshi Funato, Chigasaki; Shigeyoshi Misawa, Tokyo, both of Japan

[73] Assignee: Ricoh Company, Ltd., Tokyo, Japan

[21] Appl. No.: 479,455

[22] Filed: Feb. 13, 1990

[30] Foreign Application Priority Data

Feb. 14, 1989 [JP] Japan .................................. 1-34615
Mar. 15, 1989 [JP] Japan .................................. 1-63344

[51] Int. Cl.$^5$ .............................................. C11B 7/00
[52] U.S. Cl. .............................. 369/44.37; 369/44.41; 369/109; 369/112
[58] Field of Search ............... 369/44.32, 44.41, 44.42, 369/44.23, 44.24, 44.11, 44.12, 109, 112, 121, 122, 44.37

[56] References Cited

U.S. PATENT DOCUMENTS 4,815,059  3/1989  Nakayama et al. .................... 369/45

*Primary Examiner*—Tommy P. Chin
*Assistant Examiner*—Robert Chevalier
*Attorney, Agent, or Firm*—Cooper & Dunham

[57] ABSTRACT

An optical head for detecting defocuses of a target comprises a waveguide element having a substrate and an optical waveguide layer formed thereon. An optical coupler and one or more pairs of photodetectors are integrated with the waveguide layer. Light reflected back from the target is coupled with the waveguide layer through the coupler and then waveguided toward the photodetectors while being collected. Each of the photodetectors can detect the waveguided light so that a focus error signal can be obtained from the difference of the outputs of the photodetectors. The photodetectors of each pair are spaced from each other in a propagation direction of the waveguide layer so that one of the photodetectors can block off a fraction of the waveguided light from the other photodetector when the target surface is in focus. In another form, two pairs of photodetectors are spaced forward and rearward from the focused position of the waveguided light, respectively, with respect to a propagation direction of the waveguide layer so as to receive different portions of the waveguided light.

4 Claims, 14 Drawing Sheets

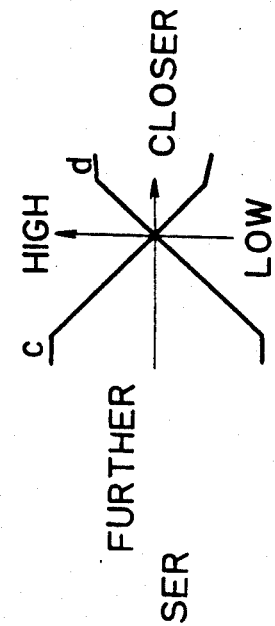
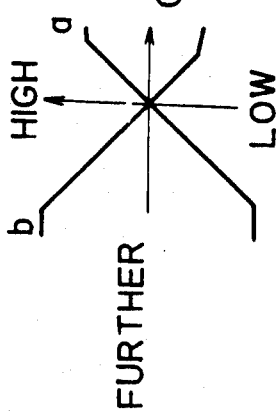
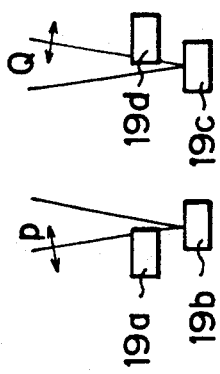
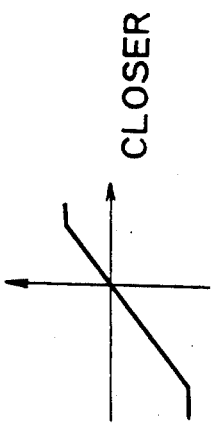
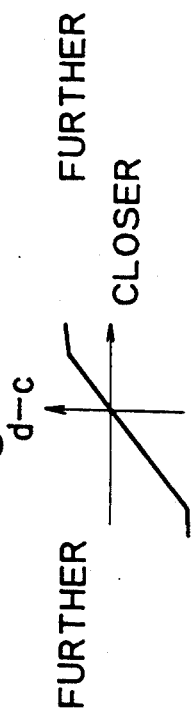
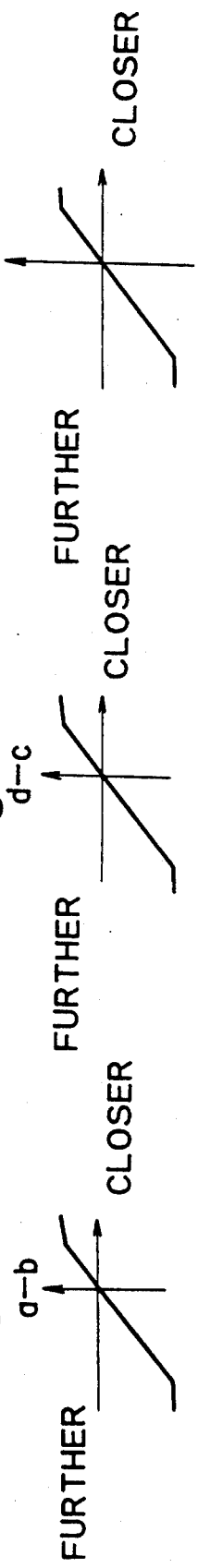

FOCUS DETECTING OPTICAL HEAD

BACKGROUND OF THE INVENTION

The present invention relates generally to an optical head for detecting defocuses of a target to be maasured using a focusing optical system. The optical head of the invention is applicable, as an optical pickup head, to an information recording and/or reproducing apparatus using optical recording medium as a target. The invention is also applicable to a focus adjusting mechanism in an optical position sensor, a microscope or the like.

In an optical information recording/reproducing apparatus, it is generally indispensable to fabricate an optical pickup head in small size and lightweight for obtaining rapid access. For this purpose, recently, it has been proposed to integrate an optical pickup head by employing a waveguide element.

An exemplary optical pickup head utilizing a collector/grating coupler is disclosed in a thesis entitled "Collector/Grating Coupler of Twin-Focus Type for Optical Pickup", published at General Meeting in 1986 of Optic-Electric Wave Department of Electro-communication Society (hereinafter referred to as a first reference). The arrangement disclosed therein is such that light emitted from a semiconductor laser is collimated by a collimating lens and then passes through a collector/grating coupler formed on an optical waveguide layer which, in turn, is formed on a transparent substrate of the waveguide element. Thereafter, the collimated light is focused on an optical disk through an objective lens. Light reflected from the optical disk passes through the objective lens and is again incident on the collector/grating coupler which can diffract a fraction of incident light so as to couple it with the waveguide layer, so that the diffracted light can be waveguided within the waveguide layer. The collector/grating coupler can also split the diffracted light into two collected light beams. Two pairs of photodetectors are integrated with the waveguide layer at two positions so that when the optical system is in focus with respect to the optical disk, one of the waveguided beams is collected at a midpoint between the photodetectors .fo one pair, while the other waveguided beam is collected at a midpoint between the photodetectors of the other pair. The photodetectors of each pair are aligned to each other in a direction transverse to the waveguide direction. Each photodetector can generate an output signal. The magnitude of the signal corresponds to the amount of light received thereon. Based on the output signals of the photodetectors, a focus error signal is obtained using a Foucault method, while a tracking signal is obtained using a push-pull method.

Japanese Patent Laying Open (KOKAI) No. 63-71946 (hereinafter referred to as a second reference) discloses another arrangement of an optical pickup head in which a grating coupler, a grating beam splitter, and several photodetectors, are integrated with a waveguide element. The arrangement disclosed therein is such that a light beam emitted from a semiconductor laser diverges through the grating coupler formed on a waveguide layer which, in turn, is formed on a transparent substrate of the waveguide element. The beam is then focused on an optical disk. through an objective lens. The light reflected back from the optical disk is converted to collected light by the objective lens and is then incident on the grating coupler which diffract a fraction of the collected light so as to couple it with the waveguide layer, so that the collected light can be waveguided within the waveguide layer. The waveguided light is then split into two collected beams deflected in different directions. Two pairs of photodetectors are disposed in the same manner as those in the first reference. A focus error signal, a tracking signal, and data signals can be obtained in the same manner as described above.

Another type of optical pickup head is disclosed in a thesis entitled "Integrated-Optic Disk Pick-up Device", published by IEEE, Journal of Lightwave Technology, Vol. LT-4, No. 7, July 1986 (hereinafter referred to as a third reference). The optical head disclosed therein comprises a waveguide element having a buffer layer and an optical waveguide layer which are successively formed on the Silicone substrate (hereinafter referred to as Si-substrate). A grating beam splitter and a collector/grating coupler are respectively formed on the waveguide layer. Further, a semiconductor laser is coupled with the end face of the Si-substrate so that a laser beam emitted therefrom is waveguided by the waveguide layer. After the waveguided beam diverges through the grating beam splitter, it is diffracted by the collector/grating coupler out of the waveguide element and is then focused on an optical disk. After the reflected light from the optical disk is again incident on the collector/grating coupler, a fraction thereof is converted into waveguided light. Thereafter, the grating beam splitter diffracts and splits the collected-waveguided light into two waveguided beams which are detected by two pairs of photodetectors in the same manner as those shown in the aforementioned references. Accordingly, A focus error signal, a tracking signal, and data signals can be obtained in the same manner as described above.

In the arrangement shown in the first reference, the focus error signal is obtained using the Foucault method, as mentioned above. In this case, in order to fabricate the optical pickup head small, a focal distance of the grating coupler has to be shortened so as to decrease the path of the detecting optical system. However, the more the focal distance is shortened, the more the diameter of focused spots of the waveguided beams at respective midpoints between the two photodetectors of the two pairs becomes small. This causes the constituent elements to be positioned in place with high accuracy so that when the optical disk is positioned at a predetermined standard position on the optical axis, the focused spots of the waveguided beams are each positioned at a midpoint between the corresponding two photodetectors.

Further, the more the path of the detecting optical system is shortened, the more the focus-error detection sensitivity, which corresponds to the ratio of the magnitude of the focus error signal to the amount of the focus error, becomes worse. In order to eliminate such a problem, it becomes necessary to decrease the gaps in size between the two photodetectors of pairs in proportion to the shortening of the detecting system path. However, there is a technical limitation, in fabricating the photodetectors, to decreasing the size of the gap between the two adjacent photodetectors placed side by side with each other. For example, if PIN type photodiodes are fabricated on the Si-substrate, a gap of more than about 10 $\mu$m occurs between the two adjacent photodiodes of each pair.

Accordingly, it has been difficult to fabricate an optical head which is small and lightweight without deteriorating detection-sensitivity to a focus error of an optical system in relation to an object.

The above-mentioned circumstances are similarly applied to the cases of the second and third references in which a focus error signal is obtained using the same Foucault method.

In the case of the third reference, particularly, for the purpose of positioning the focused spots of the collected-waveguided beams at respective midpoints of the photodetectors, it is necessary to precisely adjust a position of the semiconductor laser with respect to the Si-substrate by moving it in a direction parallel to the plane surface of the Si-substrate. However, it is very difficult to carry out such a precise adjustment while maintaining coupling of light with the waveguide layer.

SUMMARY OF THE INVENTION

It is therefore an object of the present invention to provide an optical head for detecting defocuses of a target to be measured using a focusing optical system, which is easy to fabricate in extremely small size and lightweight with increased detection sensitivity.

Another object of the present invention is to provide an optical pickup head for use in an optical information recording and/or reproducing apparatus, which is easy to fabricate in extremely small size and lightweight with increased detection sensitivity.

The present invention provides an optical head for detecting defocuses of a target, comprising:

a waveguide element having a substrate and an optical waveguide layer formed thereon;

means for coupling light reflected back from the target surface to the waveguide layer and causing the light to be waveguided and converged within the waveguide layer, the coupling means being integrated with the waveguide layer; and one or more pairs of photodetectors each for detecting the collected-waveguided light so that focus error signal can be obtained from the difference of outputs of the photodetectors, the photodetectors of each pair being integrated with the waveguide layer at positions which are spaced from each other in a propagation direction of the waveguide layer so that one of the photodetectors can block off a fraction of the collected-waveguided light from the other photodetector of the same pair when the target surface is in focus.

In the above-mentioned construction, the photodetectors are not disposed at the focused or collected position of the collected-waveguided light, but they are disposed apart from the collected position of the waveguided light in forward and rearward. That is, the photodetectors are disposed in wider regions of waveguided light. With this arrangement, the requirements of precision of the position of the photodetectors are relaxed. Accordingly, the difficulty of the adjustment which was the problem of the conventional apparatus can be eliminated. Furthermore, even if the path of the detection system is shortened so as to decrease the size of the optical pickup, the holding of the same detection sensitivity as that of the long path of the detection system can be dealt with by changing the distance from the collected position to the respective photodetectors.

Furthermore, even if the path of the detection system is shortened so as to decrease the size of the optical head, the holding of the same detection sensitivity as that of the long path of the detection system can be dealt with by changing the ratio of the sizes of the one pair of photodetectors to the other pair of photodetectors, as well as the distance from the predetermined focused position to the respective photodetectors. If all of the photodetectors are disposed at or close to the focused or collected position of the collected-waveguided light, it will be possible to decrease the size thereof only by narrowing the gaps between the respective photodetectors of each pair. In comparison to this, in the invention, the optical head can be decreased in size by means of several parameters other than narrowing of gaps, with less restriction to the photodetectors, because free degree of design is increased to the large extent.

The invention also provides an optical head for detecting defocuses of a target, comprising:

a waveguide element having a substrate and an optical waveguide layer formed thereon;

means for coupling light reflected back from the target to the waveguide layer and causing the light to be waveguided and converged within the waveguide layer, the coupling means being integrated with the waveguide layer; and two pairs of photodetectors each for detecting the collected-waveguided light so that focus error signal can be obtained from the difference of outputs of the photodetectors, the respective pairs of photodetectors being integrated with the waveguide layer and spaced forward and rearward from the focused position of the collected-waveguided light with respect to a propagation direction of the waveguide layer so as to receive different portions of the collected-waveguided light.

The invention also provides an optical pickup head for use in an optical information recording and/or reproducing apparatus, comprising:

a light source for emitting light;

means for focusing the emitted light from the light source on an optical recording medium;

a waveguide element having a substrate and an optical waveguide layer formed thereon;

means for coupling light reflected back from the medium to the waveguide layer and causing the light to be waveguided and converged within the waveguide layer, the coupling means being integrated with the waveguide layer; and two pairs of photodetectors each for detecting the collected-waveguided light so that focus error signal can be obtained from the difference of outputs of the photodetectors, the respective pairs of photodetectors being integrated with the waveguide layer and spaced forward and rearward from the focussed position of the collected-waveguided light, respectively, with respect to a waveguide direction of the waveguide layer so as to receive different portions of the collected-waveguided light.

In the above-mentioned construction, since the collected-waveguided beams are partially blocked off by the side edge of photodetectors, a high focus-error detection sensitivity is obtained even at a region around the in-focus position.

Further objects and advantages of the present invention will become apparent from the following description of the preferred embodiments of the invention as illustrated in the accompanying drawings.

BRIEF DESCRIPTION OF THE DRAWINGS

FIGS. 7A to 7F are characteristic diagrams for explaining a detection sensitivity of the optical head of the second embodiment;

FIGS. 14A to 14F are characteristic diagrams for explaining a detection sensitivity of the optical head shown in the aforementioned third reference;

DESCRIPTION OF THE PREFERRED EMBODIMENTS

Referring now to FIGS. 1 to 4, there is shown an optical head of a first embodiment of the present invention, which is applied to an optical information recording/reproducing apparatus.

Figure 2:
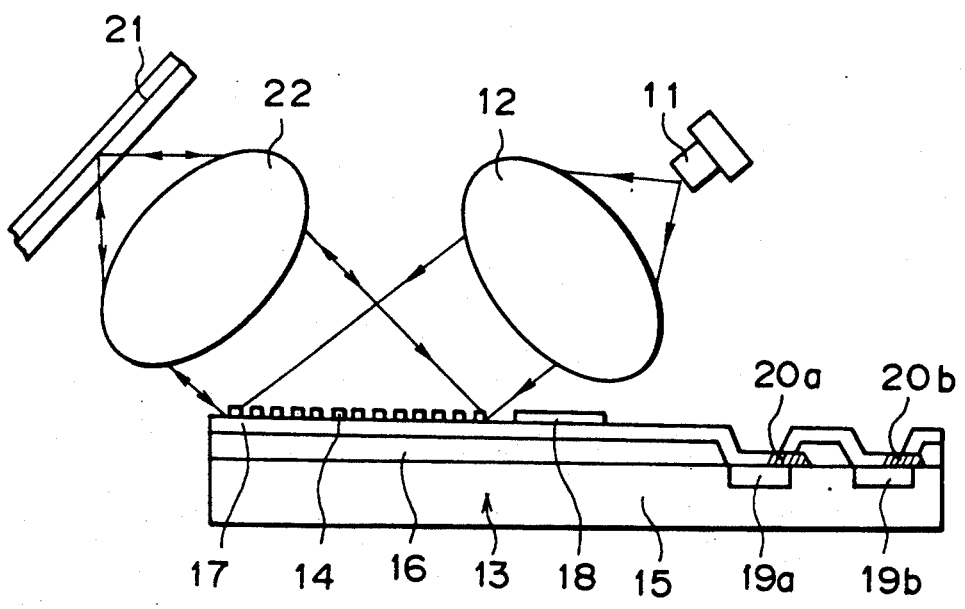
FIG. 2 is a diagrammatic cross-sectional elevation view of the first embodiment.

As shown in FIG. 2, a laser beam emitted from a light source 11 is collimated by a collimating lens 12. The collimated beam is then incident on a grating coupler 14 of a waveguide element 13. The grating coupler 14 is loaded on an optical waveguide layer 17 which in turn, is loaded on an opaque substrate 15 of the waveguide element 13 via a cladding layer 16. On the side of the substrate 13 on which the waveguide layer 17 is loaded, a waveguide lens beam splitter 18, as well as two pairs of photodetectors 19a to 19d and four electrodes (only two photodetectors 19a and 19b and two electrodes 20a and 20b are shown in FIG. 2) are also loaded, as also shown in FIG. 2. The waveguide element 13 having such a construction is disposed between the light source 11 and an optical recording medium (i.e., a target or object to be measured) 21 at a predetermined inclination, as shown in FIG. 2.

After the collimated light is incident on the grating coupler 14, although a fraction of the light is diffracted, the light is almost totally reflected by the surface of the grating coupler 14 and a boundary surface between the cladding layer 16 and the substrate 15. In this way, the reflected beam is then focused on the medium 21 by means of a collector/objective lens 22. The light beam reflected back from the medium 21 is again collimated by the lens 22 and then incident on the grating coupler 14. At this time, a fraction of the light is diffracted by the grating coupler and thus coupled to the waveguide layer 17, so that the light is then waveguided within the waveguide layer.

The waveguided light is then split into two beams P and Q by means of the beam splitter 18 toward the two pairs of photodetectors which are located on one side of the substrat,e 15. More specifically, the waveguided beam P is collected toward a first pair of photodetectors 19a and 19b, while the other waveguided beam Q is collected toward a second pair of photodetectors 19c and 19d. These photodetectors can generate output signals which correspond to the amount of light receive therein. The output signals of the photodetectors are led out from the optical head through the electrodes, individually, and processed to obtain focus error signal, tracking error signal, and data signal.

Figure 1:
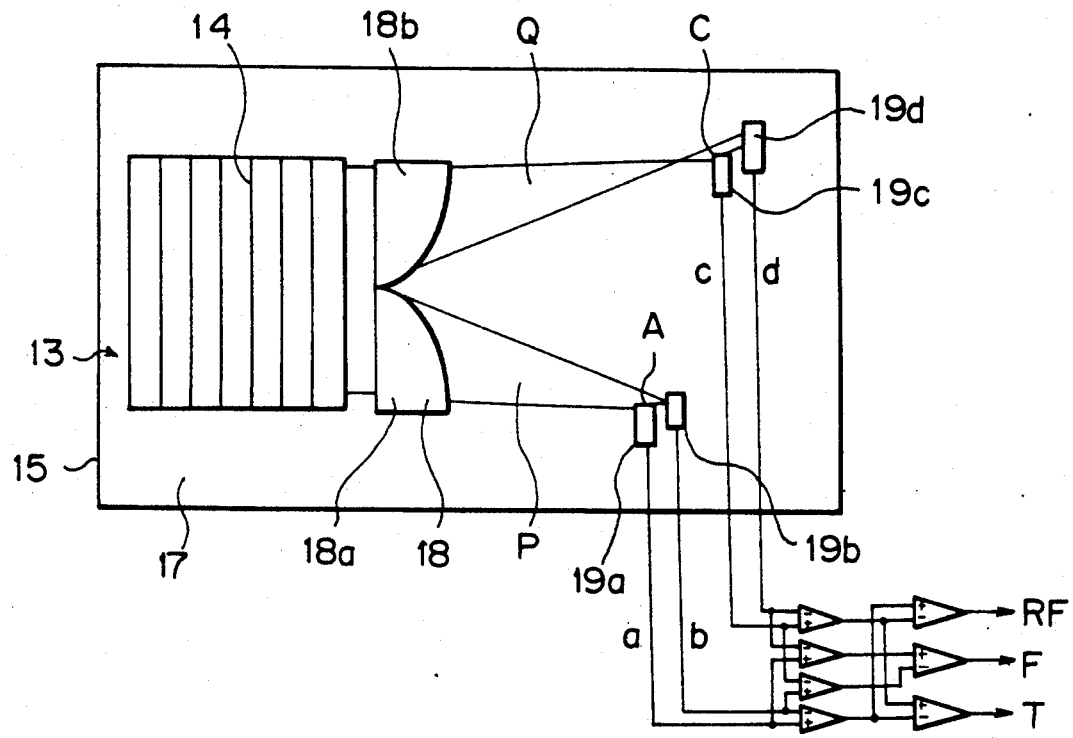
FIG. 1 is a plan view of a waveguide element for an optical head showing a first embodiment of the present invention.

FIG. 1 shows a state in that the medium 21 is in perfect focus. In this state, the photodetector 19a in the first pair is located at the fore side of the collected or focused position of the collected-waveguided beam P, i.e., the side closer to the beam splitter 18, so that it can block off approximate a half of the beam P which would otherwise have been incident on the other photodetector 19b of the first pair, which is located at the collected position of the beam P. On the other hand, the photodetector 19d in the second pair is located at the rear side of the collected or focused position of the collected-waveguided beam Q, i.e., the side far from the beam splitter 18, while the other photodetector 19c of the second pair is located between the focused position of the beam Q and the photodetector 19c so that it can block off approximate a half of the beam Q which would otherwise have been incident on the photodetector 19d.

In this case, the photodetectors 19a and 19c may be located at either lateral side of the corresponding collected-waveguided beams P and Q, respectively. However, it is desirable to locate them at the side where the beams P and Q are laterally shifted in a larger extent, as will be described hereinafter in more detail. Further, the arrangement of the other photodetectors 19b and 19d is such that the whole of the rest of the beams P and Q which are not blocked off by the photodetectors 19a and 19c can be received in the photodetectors 19b and 19d.

As described above, in this embodiment, the photodetectors of each pair are shifted in the propagation direction as well as the lateral direction.

In the particular form, as shown in FIG. 2, the electrodes connected to the photodetectors 19a and 19c are utilized to block off the beams P and Q, respectively, or the photodetectors 19a and 19c are constructed to absorb the beams P and Q, respectively.

In the first embodiment, various kinds of light source such as semiconductor laser or LED may be used as the light source. However, it is desirable to select light source having well spatial coherence.

Semiconductor substrate made of Si or GaAs or the like may be used as the opaque substrate 15. Such a semiconductor substrate has an advantage in that the photodetectors 19a to 19d can be directly formed in the substrate. Of course, the substrate may also be made of other materials such as metal, dielectrics, glass, plastics etc. In this case, however, when the substrate 15 is made of material having relatively low reflectance, it is necessary to provide a metal reflection layer between the substrate 15 and the cladding layer 16.

It is required that the cladding layer 16 and optical waveguide layer 17 are each made of transparent material such as dielectrics or the like and that the reflectance of the waveguide layer 17 is higher than that of the cladding layer 16.

Although the grating coupler 14 illustrated is of the type including parallel, straight gratings with constant distances therebetween, the grating coupler may be of a bulk-phase type, or a type including gratings with disconstant distances or curved gratings. The grating coupler 14 may be made using etching, diffusion, cutting or the like after thin-film forming.

The waveguide lens beam splitter 18 may be made in the same manner as that used for the grating coupler 14. Although the illustrated beam splitter 18 has a lens function, other type of beam splitter having only a beam-splitting function may be used when the grating coupler 14 is constructed to have a light-collecting function using curved gratings, and when a waveguide lens is provided between the grating coupler 14 and the beam splitter 18. Further, in order to split waveguided beam into two, is possible to use a grating beam splitter or a triangular waveguide mirror instead of the waveguide lens beam splitter.

In the case that the waveguide lens beam splitter 18 is used, it is possible to adjust positions of the collected spots of the collected-waveguided beams at the in-focus state by changing the curvatures of waveguide lens portions 18a and 18b of the beam splitter 18.

Although the illustrated photodetectors 19a to 19d are of the junction type, schottkey barrier photodiodes may be used. Further, amorphous Silicon photodiode may be used with an adequate type of substrate. In this case, however, the photodetectors which are disposed at the fore side of the other photodetectors in the same pairs have to be provided with additional means for blocking off the waveguided beam incident thereon, because of the transparency thereof. The electrodes may be used as such blocking means.

Explanation will now be made as to the method for detecting the focus error signal in the first embodiment, with reference to FIGS. 1, 3(a) and 3(b).

The arrangement of the photodetectors 19a to 19d will be explained. In the state that the medium 21 is in perfect focus, the photodetectors 19a and 19c are so disposed as to block off approximately a half of the collected-waveguided beams P and Q from the other photodetectors 19b and 19d, respectively. Thus, the photodetectors 19a and 19c and the other photodetectors 19b and 19d can receive approximately a half of the collected-waveguided beams P and Q, respectively. In this case, it is desirable to locate the photodetectors 19a and 19c at positions as closer as possible to the focused positions of the beams P and Q, respectively.

The photodetectors 19a to 19d can generate output signals a, b, c, and d, respectively, which correspond to the amount of light received in the photodetectors.

The focus error signal F is obtained by the following equations.

$$F = (a - b) + (d - c)$$
$$= (a + d) - (b + c)$$

The output signals a to d of the photodetectors are adjusted in advance so that when the optical recording medium 21 is in perfect focus, as shown in FIG. 1, the the output signals becomes a=b, and c=d. Accordingly, the focus error signal F is obtained as F=0.

Figure 3A:
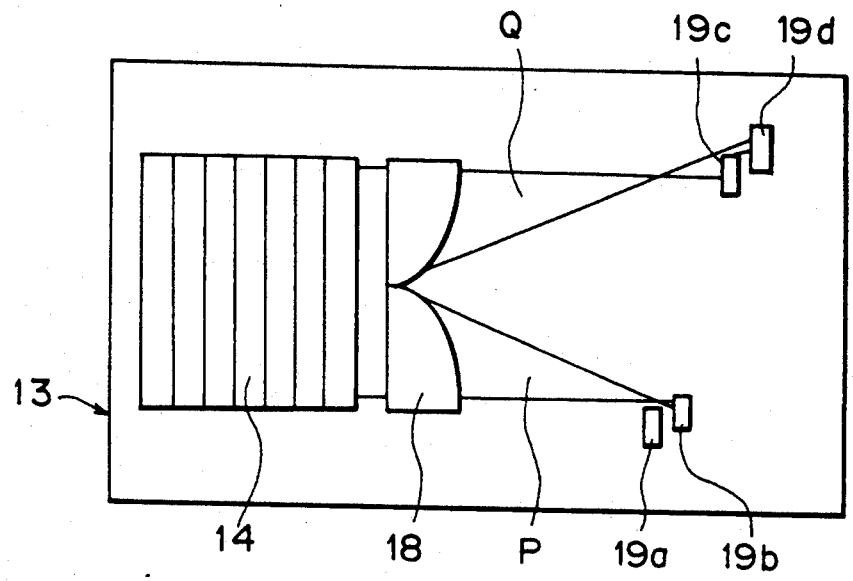
FIGS. 3A and 3B are plan views of the waveguide element of the first embodiment showing defocus conditions, respectively.
Figure 3B:
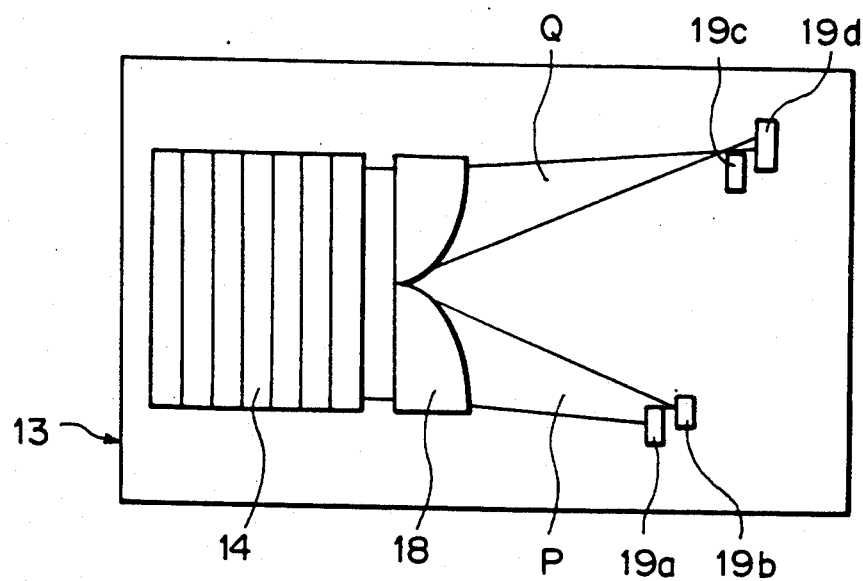

When the medium 21 is shifted away from the focus toward the objective lens 22, the focused positions of the collected-waveguided beams P and Q within the waveguide layer 17 are correspondingly shifted further away from the beam splitter 18, as shown in FIG. 3(b). In this case, the relationship between the output signals of the photodetectors is changed to a>b, and c<d. Accordingly, the focus error signal F is obtained as F>0.

Contrarily, when the medium 21 is shifted further away from the objective lens 21, the focused positions of the collected-waveguided beams P and Q within the waveguide layer 17 are correspondingly shifted closer to the beam splitter 18, as shown in FIG. 3(a). In this case, the relationship between the output signals of the photodetectors is changed to a<b, and c>d. Accordingly, the focus error signal F is obtained as F<0.

In this way, if any focus error occurs, the direction of the focus error can be detected by the positive and negative of the focus error signal F, while the magnitude of the focus error signal F corresponds to the amount of the focus error. Accordingly, the focus error can be properly detected.

On the other hand, if the medium is provided with tracking grooves or pits, the tracking error signal T is obtained by the equation T=(a+b)−(c+d). The output signals of the photodetectors are adjusted in advance so that when the focus point is on the track, the relationship between the output signals are obtained as a+b=c+d. In this case, when the above-mentioned relationship therebetween for obtaining a focus error signal is taken into consideration, the equation has to be taken as a=b=c=d, and thus T=0. When the track is shifted away from the focus, the equation changes to (a+b)>(c+d) or (a+b)<(c+d) in accordance with the direction of shift thereof. Accordingly, the tracking error signal is obtained as T>0 or T<0. Therefore, the tracking can be also properly detected.

Further, the information signal RF is detected by the equation RF=a+b+c+d.

Figure 5:
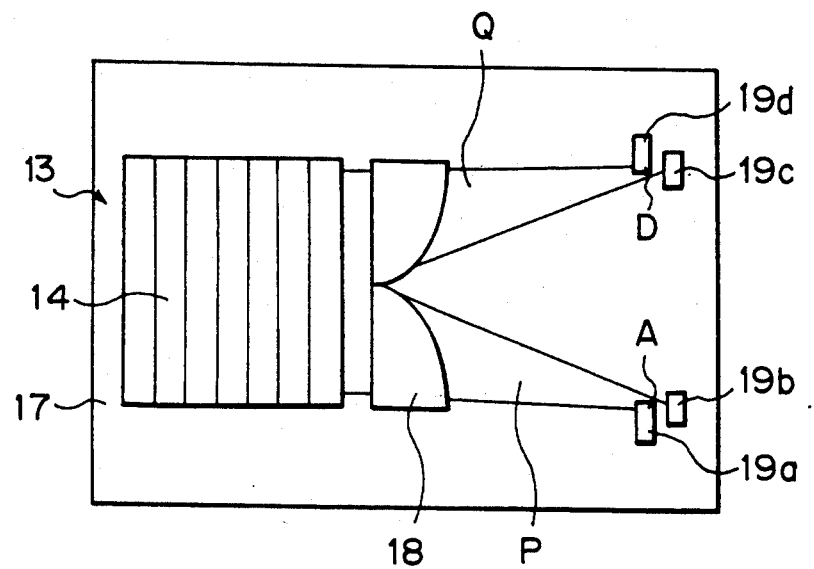
FIG. 5 is a plan view showing a second embodiment of the present invention.

Referring now to FIGS. 5, there is shown a second embodiment, in which the same constituent elements as those in the first embodiment are represented by the same reference numerals. In this embodiment, both first and second pairs of photodetectors are disposed at the same side of the collected positions of the collected-waveguided beams P and Q, respectively, with respect to the propagation direction of the beams. More particularly, the first pair of photodetectors 19a and 19b of the second embodiment are arranged at the fore side of the collected position of the collected-waveguided beam P in the same manner as that for the first pair of photodetectors 19a and 19b of the first embodiment, but the the second pair of photodetectors 19c and 19d of the second embodiment are arranged symmetrically to the first pair of photodetectors 19a and 19b with respect to the longitudinal axis of the waveguide layer 17.

Figure 6:
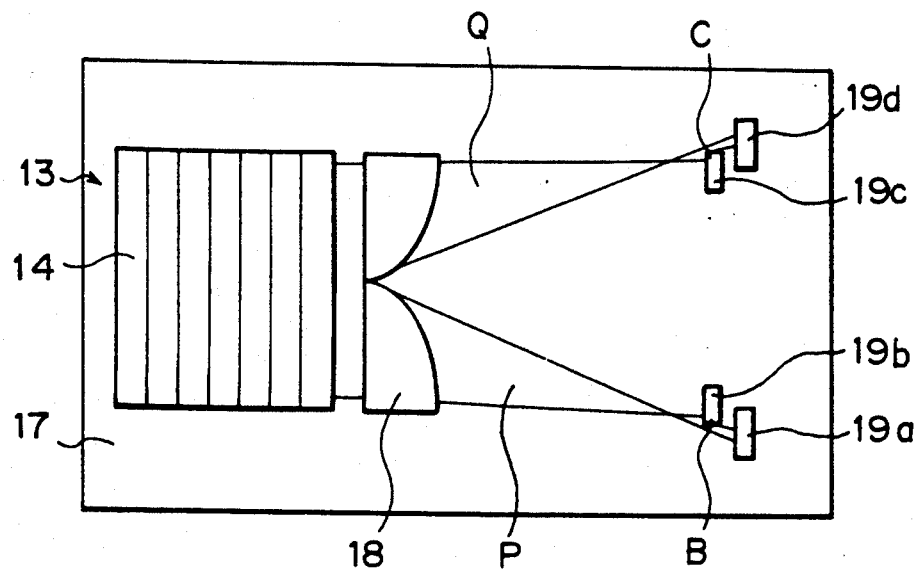
FIG. 6 is a plan view of a modified form of the waveguide element shown in FIG. 5.

FIG. 6 show an arrangement of the optical head similar to that of the second embodiment. Namely, both first and second pairs of photodetectors of this embodiment are disposed at the same side of the focused positions of the collected-waveguided beams P and Q, respectively, with respect to the propagation direction of the beams P and Q. More particularly, however, the second pair of photodetectors 19c and 19d of this embodiment are disposed at the rear side of the of the collected position of the collected-waveguided beam Q in the same manner as that for the first pair of photodetectors 19c and 19d of the second embodiment, and the first pair of photodetectors 19a and 19b of this embodiment are disposed symmetrically to the second pair of photodetectors 19c and 19d with respect to the longitudinal axis of the waveguide layer 17.

In these arrangements shown in FIGS. 6 and 7, the focus error signal F can be obtained by the equation F=(a+d)−(b+c), in the same manner as that in the first embodiment.

Referring again to FIG. 1, reference characters A and C represent side edges of the photodetectors 19a and 19c, respectively, on which the collected-waveguided beams P and Q impinge. In the case of arrangement shown in FIG. 1, in order to increase focus-error detection sensitivity, i.e., the ratio of magnitude of focus error signal to the amount of the focus error as much as possible, it is desirable to locate the side edges A and C of the photodetectors 19a and 19c as close as possible to the collected positions of the collected-waveguided beams P and Q at the time that the medium is in focus. Similarly, in the case of the arrangement shown in FIG. 5, for the same purpose, it is desirable to locate side edges A and D of the photodetectors 19a and 19d as close as possible to the collected positions of the collected-waveguided beams P and Q at the time that the medium is in focus. Further, in the case of the arrangement shown in FIG. 6, for the same purpose, it is desirable to locate side edges B and C of the photodetectors 19b and 19c as close as possible to the collected positions of the collected-waveguided beams P and Q at the time that the medium is in focus. For that purpose, the photodetector 19b in FIG. 1, and the photodetectors 19b and 19c in FIG. 5, are located at the rear side of the focused positions of the collected-waveguided beams P and Q, respectively.

Figure 30:
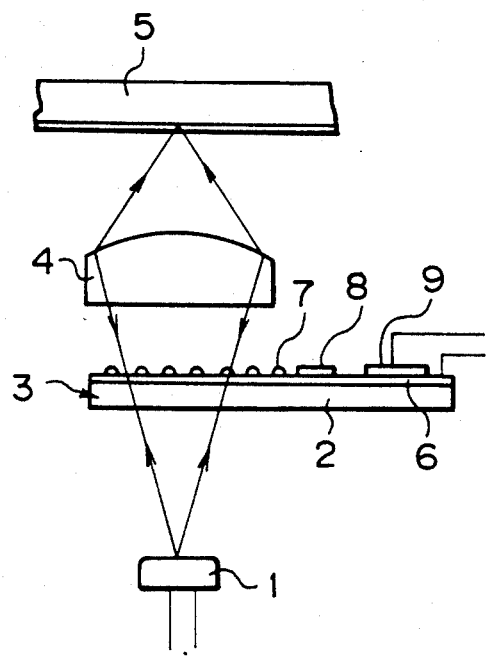
FIGS. 30 and 31 show a known optical head.
Figure 31:
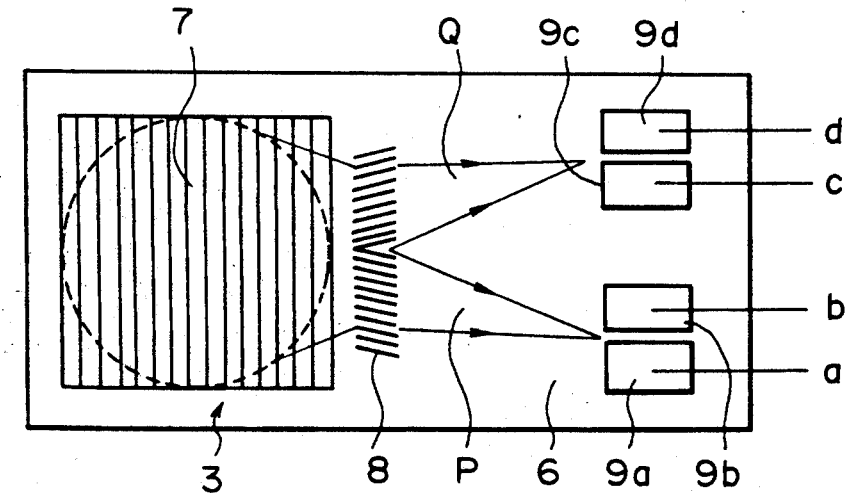

FIG. 30 and 31 show an optical head as disclosed in the aforementioned second reference, in which a grating coupler 7, a grating beam splitter 8, and two pairs of photodetectors 9a, 9b, 9c, and 9d are integrated with a waveguide element. In this arrangement, a light beam emitted from a light source 1 diverges through the grating coupler 7 to fill a collector/objective lens 4 which can focus the light on a optical disk 5. The light reflected back from the optical disk 5 is converted to a collected light by the objective lens 5 and is then incident on the grating coupler 7 which can diffract a fraction of the collected light so as to couple it with the waveguide layer 6. Namely, the focused beam from the objective lens 4 is converted to a collected-waveguided beam. The collected-waveguided beam is then split into two collected-waveguided beams P and Q. The arrangement of the first pair of photodetectors 9a and 9b is such that the beam P is collected at a midpoint between the two photodetectors 9a and 9b. Also the arrangement of the second pair of photodetectors 9c and 9d is such that the beam Q is collected at midpoint between the two photodetectors 9c and 9d.

Referring now to FIGS. 4, 7, and 14, there are shown characteristics of focus error signals obtained by the arrangements shown in FIGS. 1, 5, and 31, respectively. show the arrangements of photodetectors in the optical heads, respectively, and the collected-waveguided beams P and Q illustrated therein are of the in-focus states. On the other hand, FIGS. 4(b) to (f), as well as FIGS. 7(b) to 7(f) and FIGS. 14(b) to 14(f) show characteristic diagrams in which horizontal line represents the amount of focus error; the right-hand side thereof with respect to vertical line corresponds to the case that the optical recording medium is shifted closer to the objective lens, while the left-hand side corresponds to the case that the medium is shifted further away from the objective lens. In other words, the right-hand side of the horizontal line corresponds to the case that the focused positions of the beams P and Q are shifted closer to the photodetectors, while the left-hand side corresponds to the case that the collected positions of the beams P and Q are shifted further away from the photodetectors.

On the other hand, in FIGS. 4(b), 4(c), 7(b), 7(c), 14(b), and 14(c), vertical line represents the magnitude of output signal of the photodetectors. In FIGS. 4(d), 4(e), 7(d), 7(e), 14(d), and 14(e), vertical line represents the magnitude of differential output of the respective pairs of photodetectors. Further, in FIGS. 4(f), 7(f), and 14(f), vertical line represents the magnitude of focus error signal F.

First, in the case of the arrangement shown in FIGS. 30 and 31, when the gap between the two photodetectors of each pair is relatively large, the characteristics of focus error signal F tends to have a relatively small gradient at a region around the in-focus position. Namely, the focus-error detection sensitivity is decreased at the region around the in-focus position. In this case, when the gap between each pair of photodetectors of each pair is more decreased, it causes the focus-error detection sensitivity to be more increased. However, in practice, it is difficult, in the arrangement as shown in FIG. 31, to sufficiently decrease the gap between each pair of photodetectors. Even if it is possible to do so, it causes the detectable range of the photodetectors to be decreased.

Figure 4A:
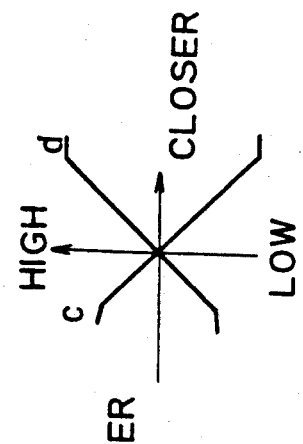
FIGS. 4A to 4F are characteristic diagrams for explaining a detection sensitivity of the optical head of the first embodiment.
Figure 4B:
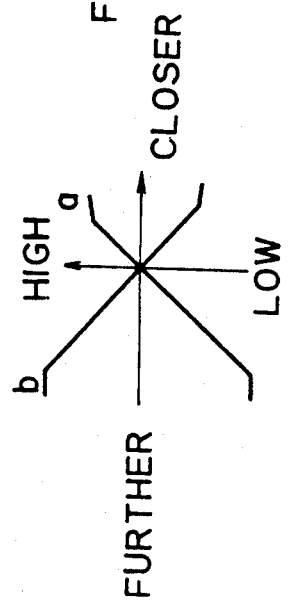
Figure 4C:
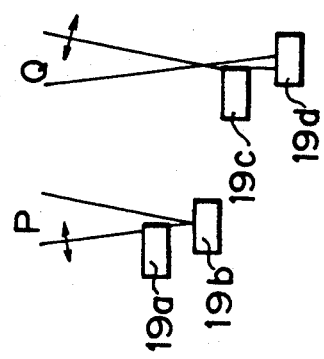
Figure 4D:
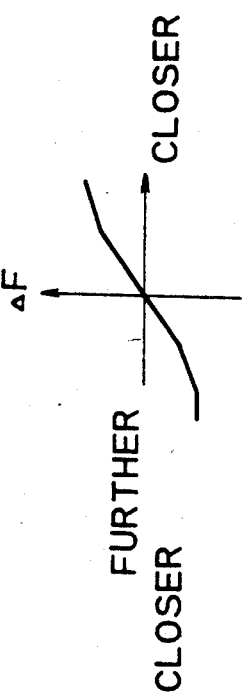
Figure 4E:
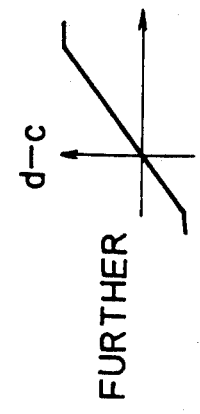
Figure 4F:
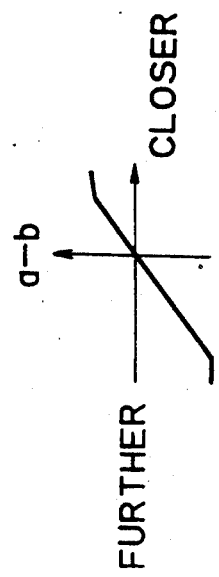

In comparison to this, in the arrangement of the photodetectors shown in FIGS. 4(a) and 7(a), since the collected-waveguided beams are partially blocked off by the side edge of photodetectors 19a and 19b, the characteristics of focus error signal F can have a relatively large gradient even at a region around the in-focus position, as shown in FIGS. 4(f) and 7(f). Thus, a high focus-error detection sensitivity is obtained even at a region around the in-focus position.

Furthermore, in the case of the arrangements shown in FIGS. 4(a) and 7(a), the detectable range is in inverse proportion to the focus-error detection sensitivity. Accordingly, when the photodetectors of the embodiment shown in FIGS. 4(a) and 7(a) are designed so as to have the same focus-error detection sensitivity as that of the arrangement shown in FIG. 14(a), a detectable range of the photodetectors in the embodiments shown in FIGS. 4(a) and 7(a) increases. This means that the arrangement shown in FIGS. 4(a) and 7(a) is advantageous to a possible deviation of the optical axis.

It will be appreciated from the comparison of FIGS. 4(f) and 7(f) that the two embodiments have substantially the same focus-error detection sensitivity and that the characteristics of focus error signal F obtained by the arrangement shown in FIG. 4(a) has a better symmetry and a wider detectable range than those obtained by the arrangement shown in FIG. 7(a).

In FIGS. 4(a) and 7(a), the photodetectors 19a and 19c, which are used to block off the waveguided beams P and Q, are located at one side of the beams P and Q, respectively, which is denoted by the arrow and at which larger shift occurs than the other side in accordance with defocus.

However, when the photodetectors 19a and 19b are located close to the focused position of the beams and the size of the depth of the photodetectors is not so large, either side of the beams may be used to locate the photodetectors 19a and 19b, because when aberration is not so large, the distribution of intensity of light becomes substantially symmetrical at a region around the collected position of the beam.

The same characteristics of focus error signal F as that obtained by the arrangement shown in FIG. 5 are also obtained by the arrangement shown in FIG. 6.

Although two pairs of photodetectors are used in the embodiments shown in FIGS. 1, 5, and 6, it is allowable to use only one pair of photodetectors. In this case, the focus error signal F is obtained by F=a−b, or F=d−c. In this case, however, the characteristics of the focus error signal F becomes dissymmetrical, and the detectable range becomes narrow, as will be easily understood from FIGS. 4(e), 4(e), 7(d), or 7(e).

Figure 8:
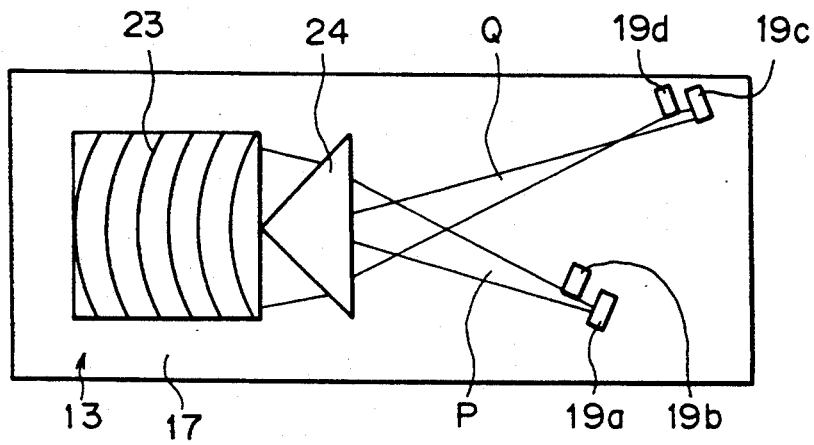
FIG. 8 is a plane view of a waveguide element showing a third embodiment of the present invention.

Referring now to FIG. 8, there is shown a third embodiment of the present invention. In this embodiment, a collector/waveguiding coupler 23 is used instead of the grating coupler 14 which is used in the first embodiment, and waveguide prism 24 is used instead of the waveguide lens beam splitter 18. Thus, the third embodiment is similar to the first embodiment, except that the focus error signal F is obtained with a sign reverse to that of the signal F obtained by the first embodiment. (The cross sectional view of this embodiment follows to that of the first embodiment as shown in FIG. 2)

Figure 9:
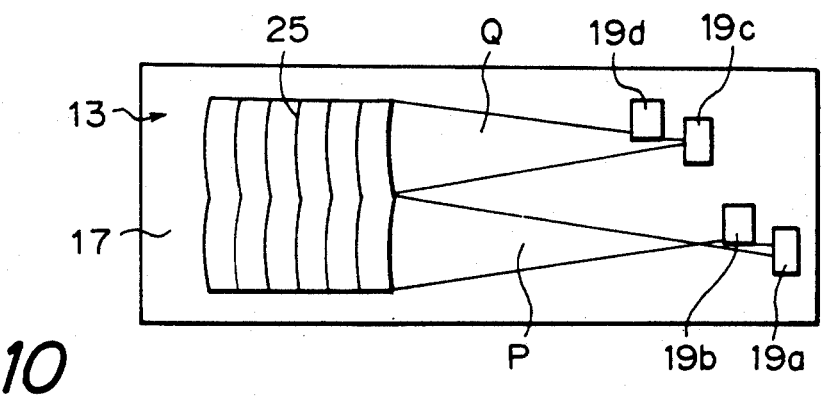
FIG. 9 is a plan view of a waveguide element showing a fourth embodiment of the present invention.

FIG. 9 shows a fourth embodiment of the present invention, in which a twin-focus type collector/grating coupler 25 is used instead of the grating coupler 14 and the waveguide lens beam splitter 18 which are used in the first embodiment.

Figure 10:
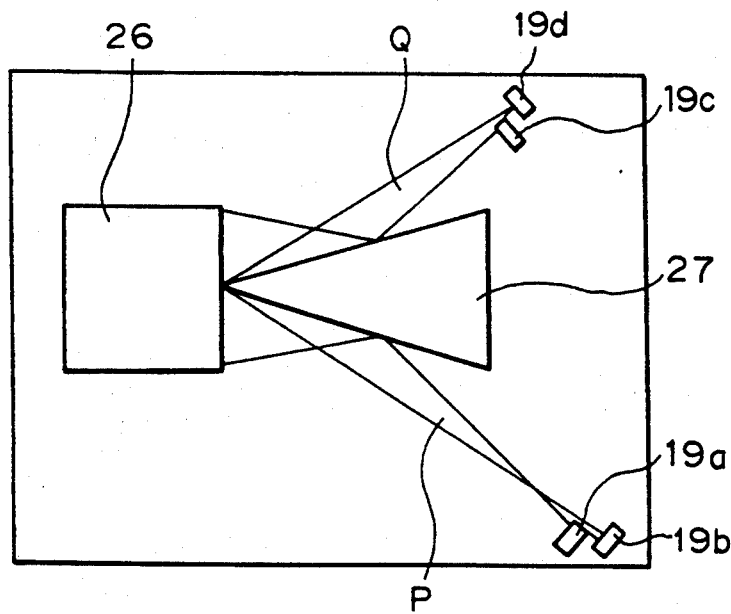
FIG. 10 is a plan view of a waveguide element showing a fifth embodiment of the present invention.

FIG. 10 shows a fifth embodiment of the present invention, in which a prism coupler 26 is used instead of the grating coupler 14 which is used in the first embodiment. Further, in this embodiment, a waveguide mirror beam splitter 27 is used instead of the waveguide lens beam splitter 18 which is used in the first embodiment. The cross sectional view of the fifth embodiment is such that the prism coupler is applied to those shown FIGS. 2, 11, or 12.

In the fifth embodiment, the light reflected back from the optical recording medium 21 is then coupled to the optical waveguide layer 17 by means of the prism coupler 26, and thus the light is waveguided within the waveguide layer. Although in the illustrated arrangement, the reflected light from the medium 21 is in the form of a collected or convergent light, the reflected light may be in the form of collimated light. In the latter case, the waveguide mirror beam splitter 27 is formed with opposite concave surfaces so as to have a collecting function.

In the above mentioned third and fifth embodiments, focus error signal F is obtained by F=(b+c)−(a+d) where the output signal of the photodetectors 19a, 19b, 19c, and 19d are represented by a, b, c, and d, respectively. In the fourth embodiment, focus error signal F is obtained by F=(a+d)−(b+c) where the output signal of the photodetectors 19a, 19b, 19c, and 19d are represented by a, b, c, and d. In these case, the focus error signals F have the same sign as that of the first embodiment. Further, in these embodiments, tracking error signal T is obtained by T=(a+d)−(b+c), while the data signal RF is obtained by RF=a+b+c+d.

Figure 11:
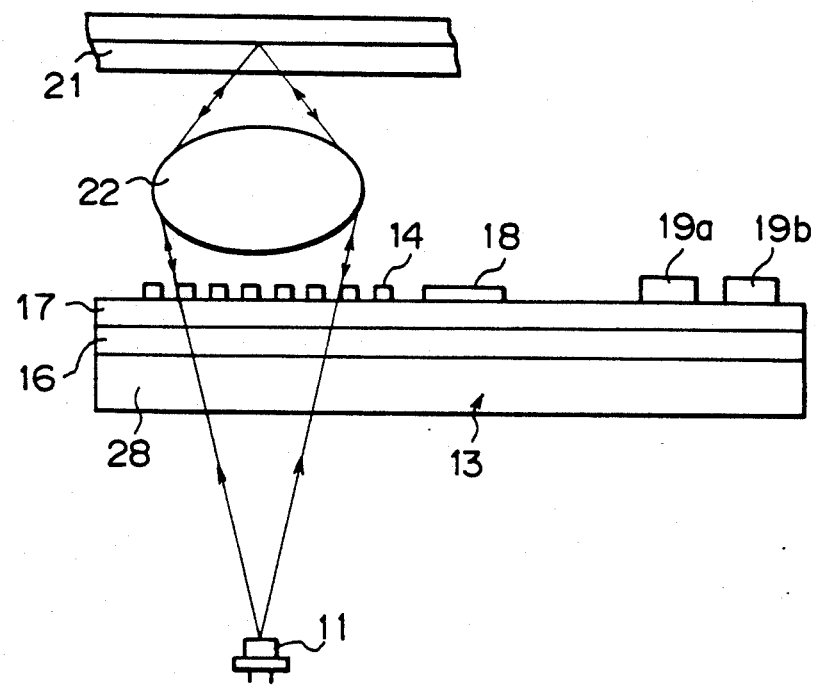
FIG. 11 is a diagrammatic cross-sectional elevation view of an optical head showing a sixth embodiment of the present invention.

Referring now to FIG. 11, there is shown a sixth embodiment of the present invention, in which the waveguide element 13 is disposed between the light source 11 and the optical recording medium 21, and thus an transparent substrate 28 is applied to the waveguide element instead of the opaque substrate 15. In this embodiment, accordingly, the light emitted from the light source passes through the transparent substrate 28 of the waveguide element and then focused on the medium 21 by means of the collector lens 22. In this embodiment, the photodetectors 19a, 19b, 19c, and 19d are of amorphous Silicon-photodiode or the like. The top view of the waveguide element 13 follows the above-mentioned embodiments shown in FIGS. 1, 5, 6, 8, and 9.

Figure 12:
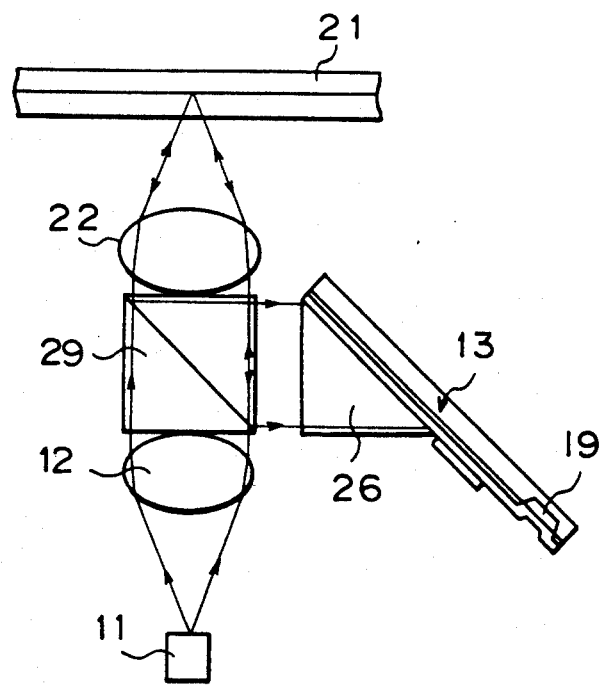
FIG. 12 is a diagrammatic cross-sectional elevation view of an optical head showing a seventh embodiment of the present invention.

Referring now to FIG. 12, there is shown a seventh embodiment of the present invention, in which illuminating system for illuminating light on the optical recording medium 21 and detecting system for detecting the light reflected back from the medium are separated from each other through a half-mirror (beam splitter) 29. That is, the light emitted from the light source 11 passes a collimating lens 12, half-mirror 29, and collector lens 22 and then focused and illuminated on the medium 21. The light reflected back from the medium passes again through the collector lens 22 and then reflected by the half-mirror 29, so that the reflected light is separated from the illuminated light. The reflected light is then incident on the prism coupler 26 of the waveguide element 13, and thus coupled into the waveguide layer 17 by means of the prism coupler.

Although the top view of this embodiment follows to that shown in FIG. 10, other arrangements may be applied thereto.

Figure 13:
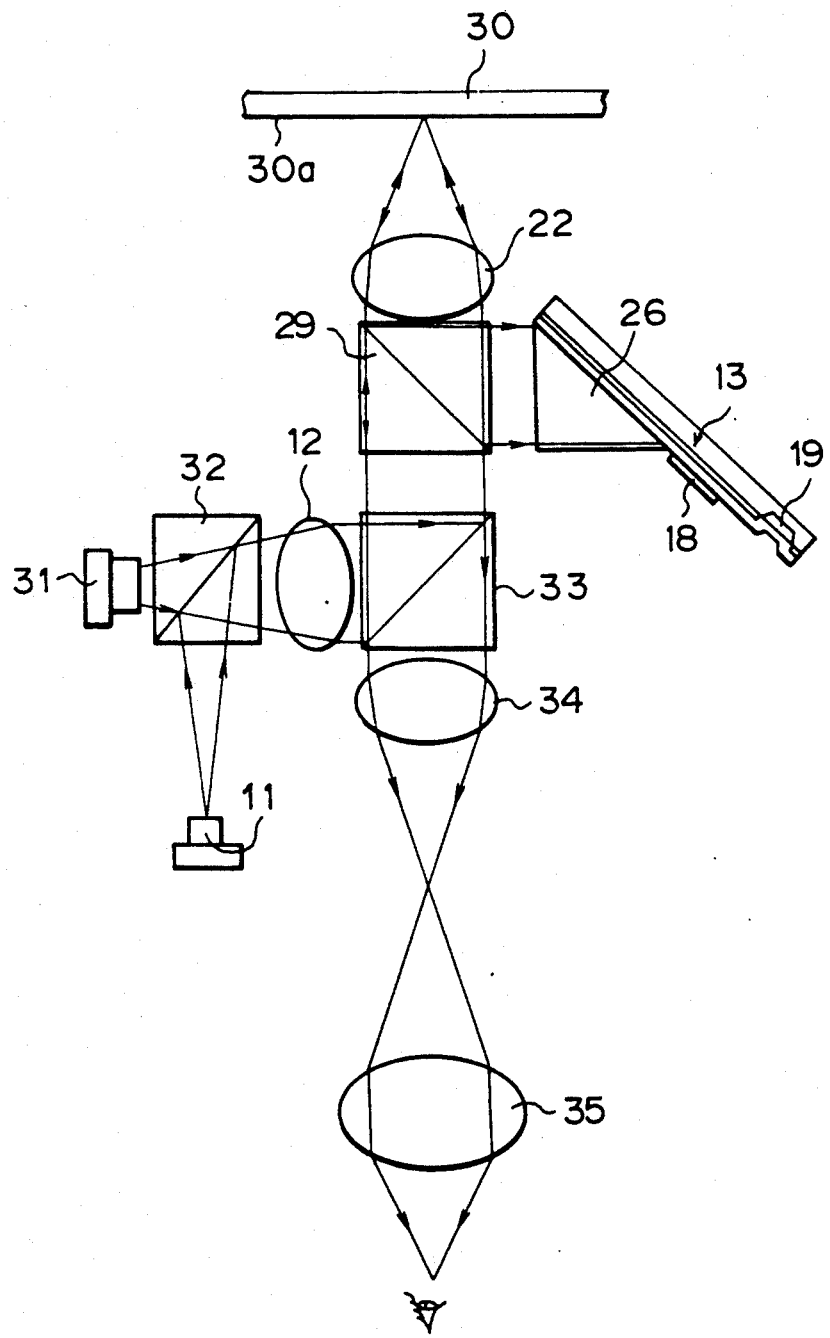
FIG. 13 is a diagrammatic cross-sectional elevation view of an optical head showing a eighth embodiment of the present invention.

Referring now to FIG. 13, there is shown a eighth embodiment. This embodiment is applied to a positioning sensor in which an object 30 having a reflection surface 30a is used instead of the optical recording medium 21 which is used in the aforementioned embodiments.

In FIG. 13, the optical head is applied to a metal microscope, in which after the light emitted from the light source 31 passes through the half-mirror 32, it is collimated by the collimating lens 12 and then reflected by the half-mirror 33 through the half-mirror 22 toward the collector lens 22 which can collect and illuminate the light on the reflection surface 30a of the object 30. The image reflected back from the object reflection surface 30a passes again through the half-mirrors 29 and 33 and, then, enlarged by the relay lens 34 and the eyepiece 35 into the observer.

In this embodiment, the relationship of the positions between the collector lens 22, the waveguide element 13, the collimating lens 12, and the light source 11, are preset with respect to the object 30 so that the focus error signal F is obtained as F=0. Thus, if the object 30 is shifted away from focus, the detecting system can detect the direction and the amount of shift of the object 30. Accordingly, it is possible to return the object to the in-focus position by moving it along the optical axis so that F=0 is obtained again.

On the basis of the signal F, the object 30 may be automatically adjusted by an actuator (not shown) so as to constitute an automatic focusing system.

Referring now to FIGS. 15 to 18, there is shown an optical pickup head of a ninth embodiment of the present invention.

Figure 16:
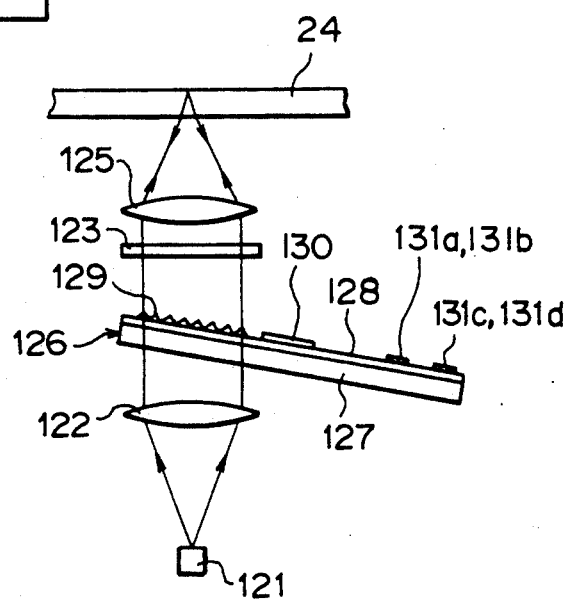
FIG. 16 is a diagrammatic cross-sectional elevation view of an optical head of the ninth embodiment.

As shown in FIG. 16, light emitted from a semiconductor laser 121 as a light source, diverges to fill a collimating lens 122 which can collimate it toward a collector/objective lens 125. The collimated light passes through a quarter-wave plate 123 into a collector/objective lens 125 which can focus it on an optical recording medium 124 such as optical disk, optical card or the like.

An optical waveguide element 126 is disposed between the collimating lens and the quarter-wave plate 123. The waveguide element 126 includes an optical waveguide layer 128 which is formed on a transparent substrate 127. Integrally formed or loaded on the optical waveguide layer 128 are a grating coupler 129 as an optical coupler, a waveguide lens 130 and two pairs of photodetectors, i.e., a first pair of photodetectors 131a and 131b and a second pair of photodetectors 131c and 131d.

The transparent substrate 127 may be made of a glass, quarts or the like, while the waveguide layer 128 is made of a material having a high refractive index which is greater than that of the substrate, e.g., ZnS, ZnO, $CeO_2$, SiN, SiON, Corning #7095 glass or the like. The waveguide layer 128 is film-formed on the substrate 127 using, for example, vacuum evaporation, spattering process, or chemical vapor deposition (CVD). On the other hand, the waveguide lens 130 may be made of SiN, $TiO_2$ or other materials having a high refractive index.

Figure 15:
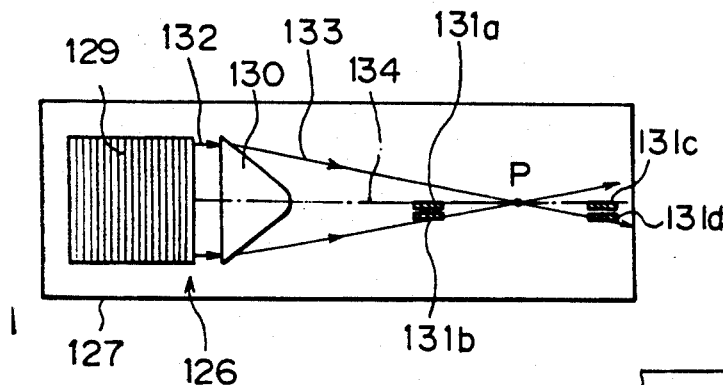
FIG. 15 is a plan view of a waveguide element showing a ninth embodiment of the present invention.

As shown in FIGS. 15 and 16, the grating coupler 129 consists of linear gratings and is positioned on the optical axis between the lenses 122 and 125.

The light reflected from the medium surface is converted to a collimated light by means of the objective lens 125 and then passes again through quarter-wave plate 123 into the grating coupler 129 which diffracts a fraction of the collimated light to couple it to the waveguide layer 128, so that the light is then waveguided within the waveguide layer in the right-hand direction in FIG. 15, toward the waveguide lens 130. The waveguide lens is oriented in the waveguiding direction of the grating coupler 129 and serves to convert the parallel waveguided light beam 132 from the grating coupler 129 to a waveguided light 133 which is converged on a collected position P.

Each of the photodetectors 131a, 131b, 131c, and 131d has a photodiode construction comprising amorphous silicon or the like and is loaded on the light waveguide layer 128 as a laminated layer.

FIG. 15 shows a plan view of the waveguide element 126 at the time that the medium 24 (FIG. 16) is in perfect focus. In this embodiment, the first pair of photodetectors 131a and 131b are disposed at the fore side of the collected position P, i.e., the side closer to the waveguide lens 130, while the second pair of photodetectors 131c and 131d are disposed at the rear side of the position P. Further, in this embodiment, both the first and second pairs of photodetectors are positioned at the same side with respect to the optical axis 134. Accordingly, the first pair of photodetectors 131a and 131b and the second pair of photodetectors 131c and 131d can receive different portions of the collected-waveguided light 133. In the other words, as shown in FIG. 15, the first pair of photodetectors 131a and 131b are adapted to receive the lower half of the collected-waveguided light 133, while the second pair of photodetectors 131c and 131d are adapted to receive the upper half of the collected-waveguided light 133.

Explanation will now be made as to the method for detecting focus error, tracking error, and data signals F, T and RF on the basis of the output signals a, b, c, and d of the photodetectors 131a, 131b, 131c, and 131d.

The focus error signal F is obtained by the equation $F=(a+d)-(b+c)$.

The output signals a, b, c, and d of the photodetectors are preset so that when the optical recording medium 124 is in perfect focus, as shown in FIG. 15, the relationship between the output signals are obtained as $a=b$, and $d=c$. Accordingly, the focus error signal F is obtained as $F=0$.

Figure 17A:
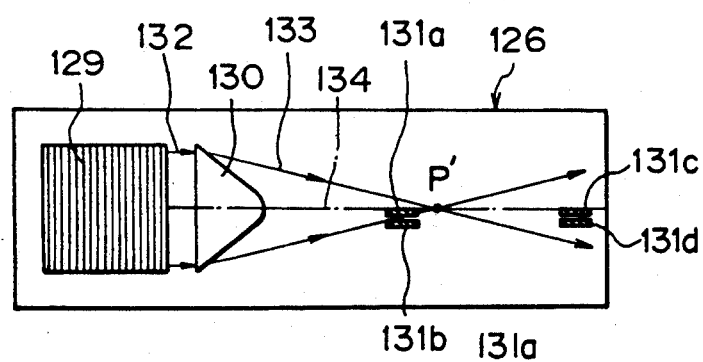
FIGS. 17A and 17B are plan views of the waveguide element of the ninth embodiment showing defocus conditions, respectively.

When the medium 124 is shifted further away from the objective lens 125, it causes the collected-waveguided light 133 to be collected at a point P', as shown in FIG. 17(a). The point P' is closer to the grating coupler 129 than the point P, In this case, the relationship between the output signals of the photodetectors is changed to $a>b$, and $d>c$. Accordingly, the focus error signal F is obtained as $F>0$.

Figure 17B:
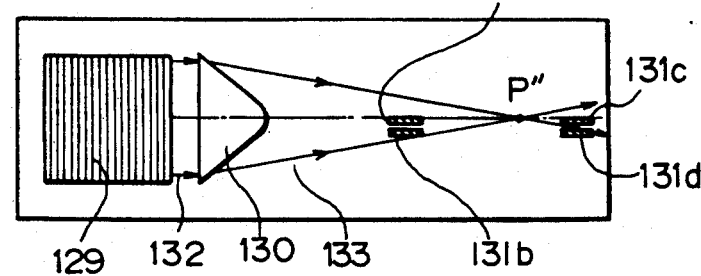

Contrarily, when the medium 124 is shifted closer to the objective lens 125, it causes the collected-waveguided light 133 to be collected at a point P'', as shown in FIG. 17(b). The point P'' is more far from the grating coupler 129 than the point P. In this case, the relationship between the output signals of the photodetectors is changed to $a<b$, and $d<c$. Accordingly, the focus error signal F is obtained as $F<0$.

In this way, if any focus error occurs, the direction of the focus error can be detected by the positive and negative of the focus error signal F, while the magnitude of the focus error signal F corresponds to the amount of the focus error. Accordingly, the focus error can be properly detected.

On the other hand, the tracking error signal T and the data signal RF are obtained by the following equations, respectively.

$$T = (a+b) - (c+d)$$

$$RF = a+b+c+d$$

It will be appreciated that the ninth embodiment can effectively utilize the characteristics that in the case of waveguide optical system, the photodetectors can be fairly freely disposed in the waveguide direction. In this connection, in the case of ordinary bulk optical system, when light is propagated and photodetectors are disposed therein, almost of the propagated light is interrupted by these photodetectors, and accordingly, other photodetectors can not be freely disposed at the rear side thereof.

In the ninth embodiment, the photodetectors 131a, 131b, 131c, and 131d are not disposed at the collected position of the collected-waveguided light 133, but they are disposed apart from the collected position of the waveguided light in forward and rearward. That is, the photodetectors are disposed in wider regions of waveguided light. With this arrangement, the requirements of disposition precision of the photodetectors 131a, 131b, 131c, and 131d are relaxed. Accordingly, the difficulty of the adjustment which was the problem of the conventional apparatus can be eliminated. Furthermore, even if the path of the detection system is shortened so as to decrease the size of the optical pickup, the holding of the same detection sensitivity as that of the long path of the detection system can be dealt with by changing the ratio of the sizes of the first pair of photodetectors 131a and 131b to the second pair of photodetectors 131c and 131d, as well as the distance from the collected position P to the respective photodetectors 131a, 131b, 131c, and 131d. In each of the aforementioned known optical heads, it is possible to decrease the size thereof only by narrowing the gaps between the respective photodetectors of each pair. In comparison to this, in the ninth embodiment of the present invention, the optical pickup head can be decreased in size by means of several parameters other than narrowing of gaps, with less restriction to the photodetectors, because free degree of design is increased to the large extent.

Figure 18:
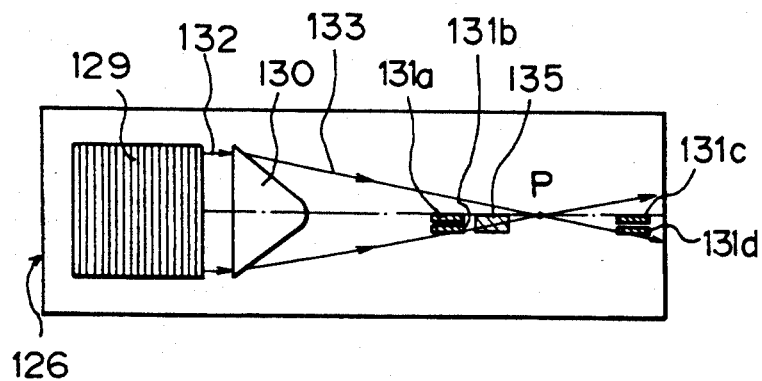
FIG. 18 is a plan view of a modified form of the waveguide element shown in FIG. 9.

As shown in FIG. 18, a light-absorbing member 135 may be loaded on the waveguide layer 128 behind the first pair of photodetectors 131a and 131b which are disposed at the fore side of the collected position P in the waveguide direction. With the provision of the light-absorbing member 135, light scattered by the first pair of photodetectors 131a and 131b does not adversely affect the second pair of photodetectors 131c and 131d disposed at the rear position. As the light-absorbing member 135, materials having light-absorbability such as Al, Au or the like may be loaded on the waveguide layer 128.

Figure 19:
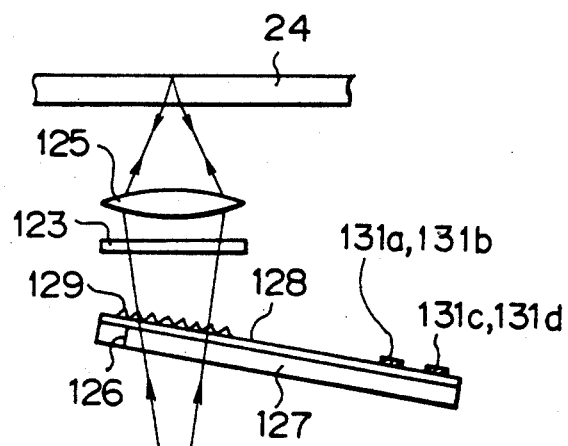
FIG. 19 is a diagrammatic cross-sectional elevation view of an optical head of a tenth embodiment of the present invention.

Referring now to FIG. 19, there is shown a tenth embodiment of the present invention, in which the collimating lens 122 used in the ninth embodiment is omitted, and, therefore, waveguide lens 130 is also omitted.

In this embodiment, light emitted from the semiconductor laser 121 diverges through the waveguide element 126 and the quarter-wave plate 123 to fill the objective lens 125 which can focus it on the optical information record medium 124. The light reflected back from the medium 124 passes again through the objective lens 125 which can collect it toward the laser 122. Namely, the reflected light is converted to a convergent reflected light by means of the objective lens and then, passes through the quarter-wave plate 123 again. Thereafter, the convergent reflected light is coupled to the optical waveguide layer 128 by means of the grating coupler 129 and thus converted to a waveguided light 133. Therefore, the waveguide lens 130 is not necessary in this embodiment.

Figure 20:
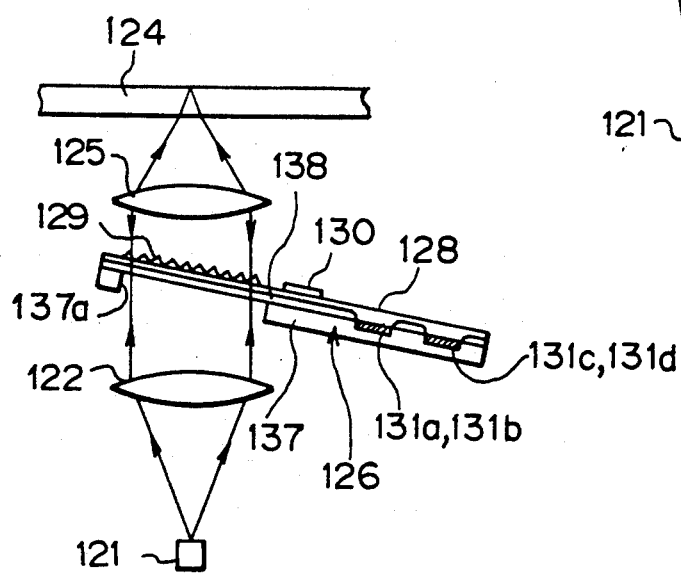
FIG. 20 is a diagrammatic cross-sectional elevation view of an optical head of an eleventh embodiment of the present invention.

Referring now to FIG. 20, there is shown an eleventh embodiment of the present invention, in which a waveguide element 126 having a semiconductor substrate 137 made of Si or the like is used instead of the transparent substrate 127 which is used in the ninth embodiment. The optical waveguide layer 128 is lamination-formed on the semiconductor substrate 137 through a buffer layer 138 which may be made of SiO$_2$ or the like. Since the semiconductor substrate 137 is used in this embodiment, it is possible to directly make to pairs of photodiodes on the substrate 137 by etching and removing a part of the buffer layer 138 and then diffusing or implanting impurities into the semiconductor substrate 137. The photodiodes are thus used as photodetectors 131a, 131b, 131c, and 131d.

Namely, in this embodiment, crystal Si is used as the photodetectors. In comparison to the photodetectors in the ninth embodiment, which are made of amorphous Si, the photodetectors of this embodiment can make it possible to obtain rapid response.

The same arrangement of the semiconductor laser 121, etc., as that used in the ninth embodiment is applied to this embodiment. Thus, the opaque semiconductor substrate 137 is formed at an optically transparent portion (corresponding to the grating coupler 129) thereof with an opening 137a by means of etching process or the like. For the etching process, wet-etching such as alkali etching, as well as dry-etching may be used.

Figure 21:
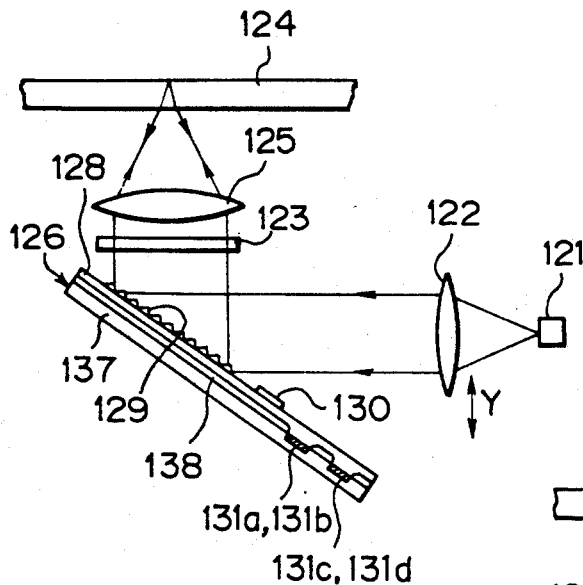
FIG. 21 is a diagrammatic cross-sectional elevation view of an optical head of a twelfth embodiment of the present invention.

Referring not to FIG. 21, there is shown a twelfth embodiment of the present invention, in which the waveguide element 126 used in the eleventh embodiment is changed to a reflection type. Thus, the semiconductor laser 121 and the objective lens 125, etc., are disposed at the same side of the waveguide element 126. In this construction, after a light beam emitted from the semiconductor 121 is collimated by the collimate lens 122, it is incident on the grating coupler 129 at which the polarized face of the light beam is polarized in a Y-direction as shown in FIG. 21. As a result, the light incident on the grating coupler 129 passes therethrough without almost being diffracted and is then reflected by the semiconductor substrate 137 provided under the grating coupler 129 toward the optical information record medium 124. The reflected light from the medium 124 is again incident on the grating coupler 129 with the polarization face turned to a direction perpendicular to the Y-direction by means of the quarter-wave plate 123. Namely, the re-incident light is converted to a s-polarized light, so it is diffracted by the grating coupler 129 so as to be coupled into and waveguided within the optical waveguide layer 128.

Figure 22:
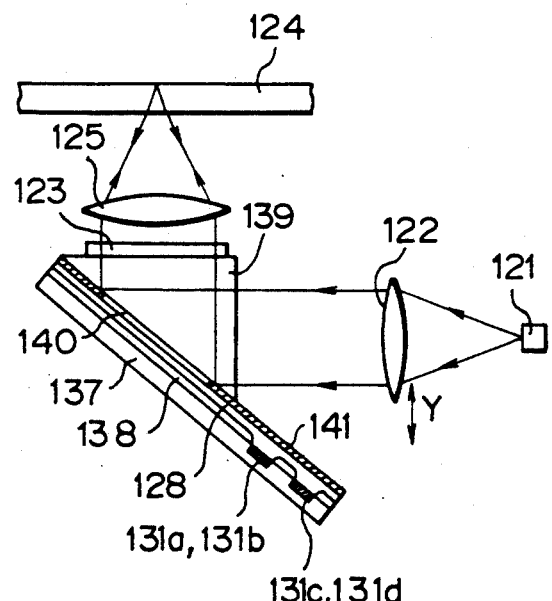
FIG. 22 is a diagrammatic cross-sectional elevation view of an optical head of a thirteenth embodiment of the present invention.

Referring now to FIG. 22, there is shown a thirteenth embodiment of the present invention. This embodiment is similar to the twelfth embodiment, except that prism coupling is utilized for the introduction of light in the optical waveguide layer 128. That is, a prism 139 is used as an optical coupler instead of the grating coupler 129. The prism 139 is adhered to the waveguide element 126 via a gap layer 140. The gap layer 140 is formed in such a manner that a part of a metal cladding layer 141, which is lamination-formed on the optical waveguide layer 128, is opened and air or an adhesive material or the like having lower refractive index is filled therein.

In the above-mentioned structure, light emitted from the semiconductor laser 121 has a polarization face in the direction shown by the arrow Y in FIG. 22. After the emitted light is collimated by the collimating lens, it is incident on the prism 139 and then totally or completely reflected at the boundary surface between the prism 139 and the gap layer 140. Accordingly, coupling of light is not caused when the polarization face is in the Y-direction. Thus, the completely reflected light goes out of the optical head to the optical information record medium 124. The light reflected back from the medium 124 is again incident on the prism 139 in the state that the polarization face thereof is turned to a direction perpendicular to the Y-direction by means of the quarter-wave plate 123, and then, it is reflected at the boundary surface between the prism 139 and the gap layer 140. At this time, evanescent waves oozed into the gap 140 are efficiently coupled into the optical waveguided layer 128 and thus waveguided as TE mode wave.

For this purpose, it is important to adjust the film thickness and refractive index of the optical waveguide layer 128 so that the equivalent refractive index $N_{TE}$ of TE mode wave, and the equivalent refractive index $N_{TM}$ of TM mode wave of the layer 128 are $N_{TE} \neq N_{TM}$. It is also important, in the arrangement as shown in FIG. 22, that when the incident light is p-polarized light, it is not coupled with TE mode wave, as well as TM mode wave of the waveguide layer and that when the incident light is s-polarized light, it is coupled with TE mode. For this purpose, the following two conditions are required:

$$N_P \sin \theta_P = N_{TE}$$

$$N_{TE} \neq N_{TM}$$

where $N_P$ represents a refractive index of the prism 139 and $\theta_P$ represents an incident angle for the boundary surface between the prism 139 and the gap layer 140.

With the above-described arrangement, in the advancing way, 100% of light is reflected at the boundary without being coupled with the optical waveguide layer 128 and in the returning way, the light is coupled with the optical waveguide layer 128, whereby signal detection being carried out by means of the waveguide element 126 including the two pairs of photodetectors 131a, 131b, 131c, and 131d.

On the other hand, in FIG. 22, a metal cladding layer 141 serves to prevent decoupling phenomenon in that after the light in the returning way which has been converted to a waveguided light by the prism coupling returns to the prism 139 through the gap layer 140.

Figure 23:
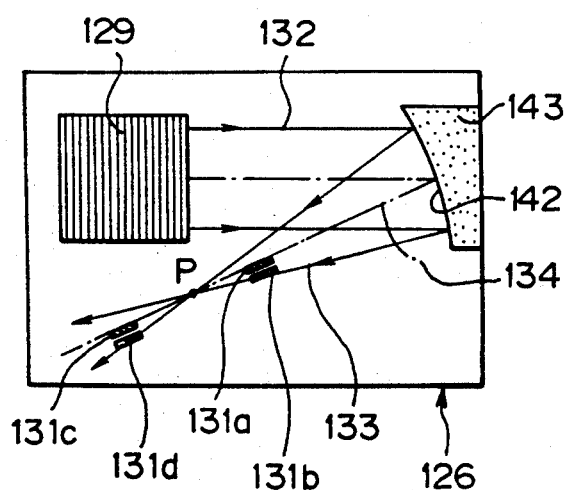
FIG. 23 is a plan view of a waveguide element showing a fourteenth embodiment of the present invention.
Figure 24:
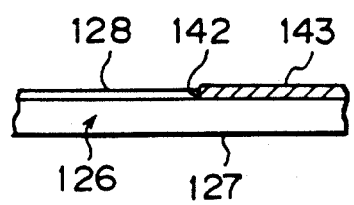
FIG. 24 is a partial sectional view of the waveguide element shown in FIG. 14.

Referring now to FIGS. 23 and 24, there is shown a fourteenth embodiment of the present invention. In this embodiment, instead of the waveguide lens 130 used in the ninth embodiment, a waveguide mirror 142 having focusing or light-collecting function is provided on the end face of the optical waveguide layer 128 in the waveguide direction of the waveguided light 132 from the grating coupler 129. In the same manner as described in the ninth embodiment, two pairs of photodetectors 131a, 131b and 131c, 131d are disposed with respect to the waveguided light 133 reflected by the waveguide mirror 142. As shown in FIG. 24, the waveguide mirror 142 is formed in such a manner that the optical waveguide layer 128 is formed as a perpendicular cross-section at a reflection surface by dry-etching. A metal layer 143 having a high refractive index made of e.g., Al, Ag, Au, Cu, etc. is formed on the substrate 127 by evaporation, sputtering process, etc., while being contacting such a perpendicular reflection face.

As shown in FIG. 23, the reflection surface of the waveguide mirror 142 is formed utilizing a part of a parabolic surface in which point P is set up as a focus. Thus, the collimated light 132 incident on the waveguide mirror 142 is aplanatically converged on the position of the point P as the convergent waveguide light 133 by the reflection. Then, the converged light is received and detected by the photodetectors 131a, 131b, 131c, and 131d to obtain focus error signals, etc., in the same manner as those in the above-mentioned embodiment.

Figure 25:
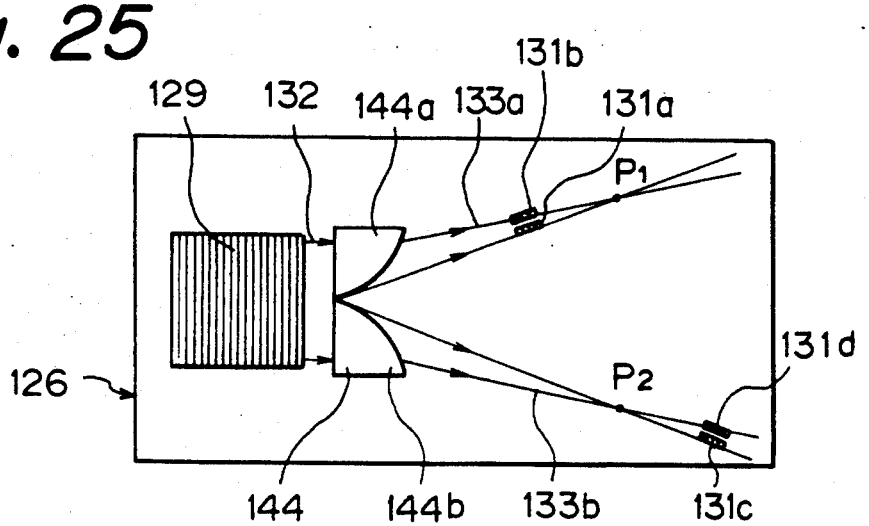
FIG. 25 is a plan view of a waveguide element showing a fifteenth embodiment of the present invention.

Referring now to FIGS. 25 and 26, there is shown a fifteenth embodiment of the present invention. In this embodiment, instead of the waveguide lens 130 used in the ninth embodiment, a twin-focus waveguide lens 144 which can split light beam generated by duplex waveguide lenses 144a, 144b into two is loaded on the optical waveguide layer 128. In this case, the upper half of the waveguided light 132 is converted to a collected-waveguided light 133a which is converged on a point $P_1$, while the lower half of the waveguided light 132 is converted to a converge-waveguide light 133b which is converged on a point $P_2$. A first pair of photodetectors 131a and 131b for receiving the collected-waveguided light 133a are disposed at the fore side of the point $P_1$, while a second pair of photodetectors 131c and 131d for receiving the collected-waveguided light 133b are disposed at the rear side of the point $P_2$.

Figure 26A:
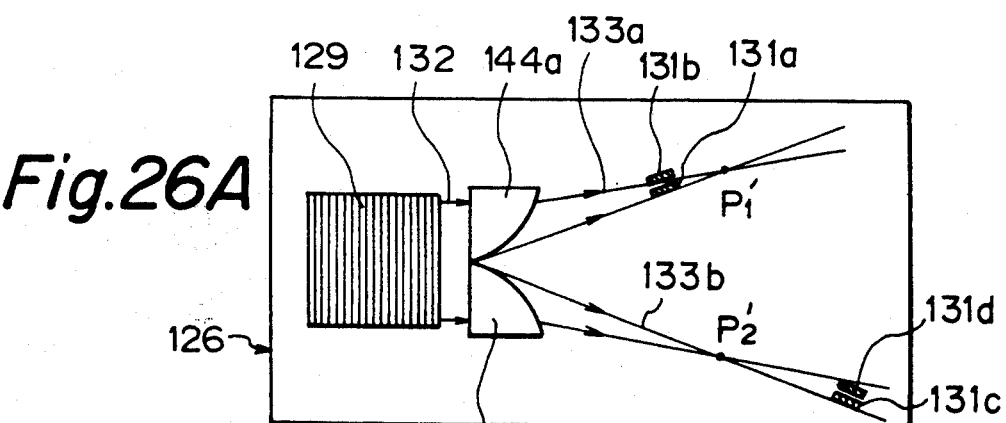
FIGS. 26A and 26B are plan views of the waveguide element of the fifteenth embodiment showing defocus conditions, respectively.
Figure 26B:
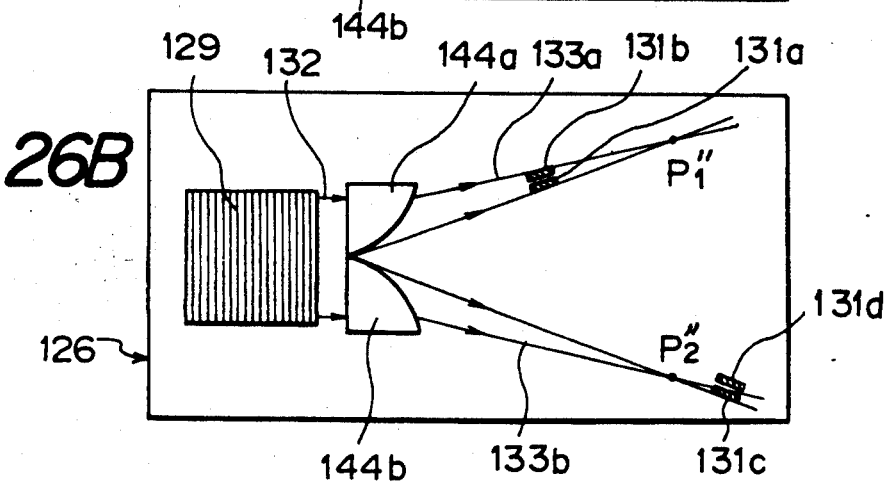

FIG. 25 shows a state when a target or optical recording medium (not shown) is in focus. When the medium is in perfect focus, the detecting output signals a, b, c, and d of the photodetectors 131a, 131b, 131c, and 131d are adjusted so as to have a relationship of a=b, and c=d. Thus, at the time of in-focus state, the focus error signal F is obtained as $F=(a+d)-(b+c)=0$. When the medium is shifted further away from the objective lens (not shown), the respective focused positions $P_1$ and $P_2$ are changed to positions $P_1'$ and $P_2'$, respectively, as shown in FIG. 26(a). Accordingly, the relationship between the output signal becomes a>b and c<d, and thus the focus error signal F is obtained as F>0. In contrast, when the medium becomes close to the objective lens, the respective focused positions $P_1$, $P_2$ are changed to positions $P_1''$, $P_2''$, respectively, as shown in FIG. 26(b). As a result, the relationship between the output signals becomes a<b and c=d, and thus the focus error signal F is obtained as F=0. In this way, the focus error signal F can be properly detected.

The tracking signal T as well as the information signal RF can be also detected in the similar way with the ninth embodiment.

Figure 27:
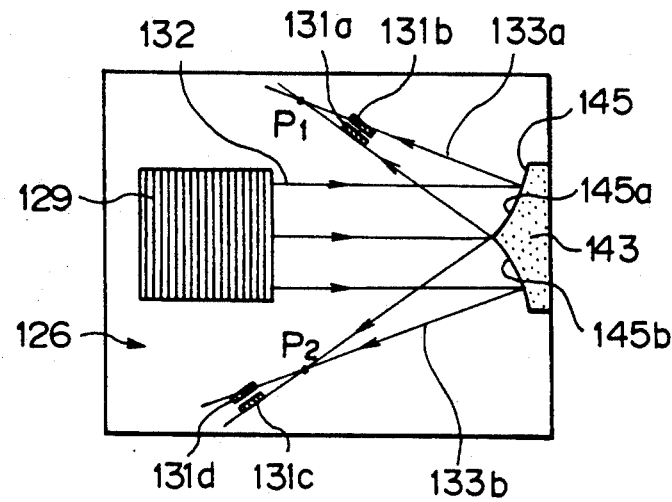
FIG. 27 is a plan view of a waveguide element showing a sixteenth embodiment of the present invention.

Referring now to FIG. 27, there is shown a sixteenth embodiment of the present invention, in which instead of the waveguide mirror 142 used in the fourteenth embodiment, a twin-focus waveguide mirror 145 including two waveguide mirrors 145a and 145b is used. The waveguide mirror 145a is formed with a parabolic configuration having a focused position at a point P₁ or a circular configuration approximate thereto. On the other hand, the waveguide mirror 145b is formed with a parabolic configuration having a focused position at a point P₂ or a circular configuration approximate thereto. The other matters of this embodiment follow the fourteenth and fifteenth embodiments.

Figure 28:
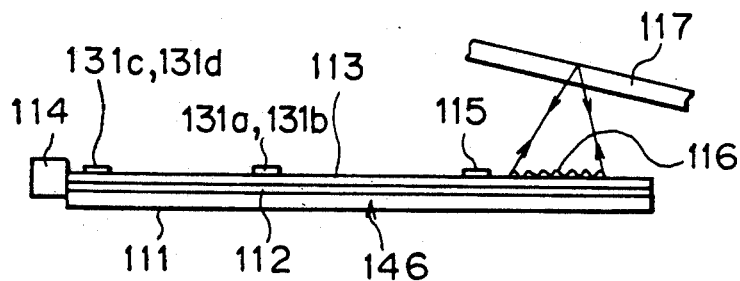
FIG. 28 is a diagrammatic cross-sectional elevation view of an optical head of a seventeenth embodiment of the present invention.
Figure 29:
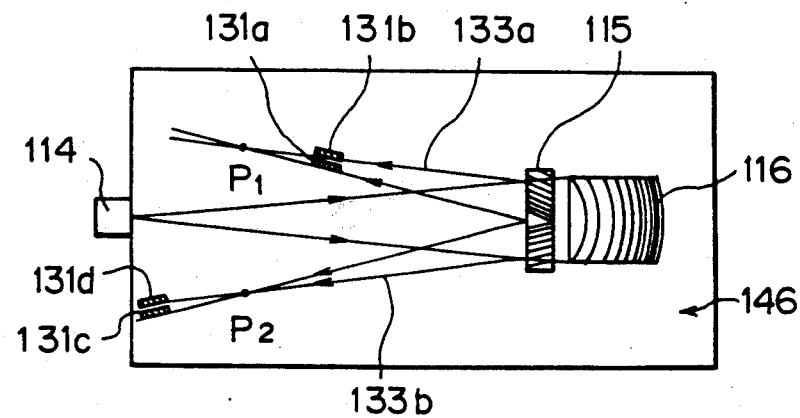
FIG. 29 is a plan view of the waveguide element shown in FIG. 28.

Referring now to FIGS. 28 and 29, there is shown a seventeenth embodiment of the present invention. This embodiment is suitable for the apparatus as shown in the aforementioned third reference. In this embodiment, a waveguide element 146 comprises an optical waveguide layer 113 which is formed on a substrate 111 via a buffer layer 112. A grating coupler 116, which is used as a collector lens and an optical coupler, as well as a beam splitter 115 is formed on the waveguide layer. Further, a semiconductor laser 114 is coupled with the end face of the waveguide element 146 so that a laser beam emitted therefrom is waveguided by the waveguide layer toward the grating coupler 116 through the beam splitter 115. The shown) is collected and coupled to the waveguide layer 146 by means of the grating coupler 116. The beam splitter 115 can split the collected-waveguided light into two collected-waveguided lights 133a and 133b. A first pairs of photodetectors 131a and 131b are disposed at the fore side of the focused position P₁ of the collected-waveguided light 133a, while a second pairs of photodetectors 131a and 131b are disposed at the rear side of the collected position P₁ of the collected-waveguided light 133b. In this embodiment, therefore, a focus error signal F, etc. can be detected in the same manner as those used in the afore mentioned embodiments.

As mentioned above, even though the present invention is applied to the third reference, the arrangement adjustment of the semiconductor 114 coupled with the end face of the substrate 111 can be greatly relaxed because the detection is conducted by the duplex photodetectors 131a, 131b and 131c, 131d at wider portion of the convergent waveguided light 133a, 133b. Thus, the adjustment of signal detection can be readily carried out while maintaining coupling with respect to the optical waveguide layer 128, whereby the decrease in size of the apparatus and the practice thereof can be realized.

As described above, the two duplex photodetectors are shifted in such a manner that one pair of the duplex photodetectors is disposed at the front side from the collected position and the other pair of the duplex photodetectors is disposed in the rear side from the focused position and that the individual duplex photodetectors are disposed at waveguiding position for light-receiving the different portions of the convergent waveguided light. Accordingly, when the shift of focus occurs, the light-receiving state of the convergent waveguided light by the two duplex photodetectors varies in response to the direction of shift in the focal point. Thus, by previously setting up the relationship of the detection output at the focused time and by treating the detection signal of these duplex photodetectors, focus error signal can be detected. Under these construction, even though the duplex photodetectors are not positioned at a collected position of the converged waveguided light, the detection of focus error signal becomes possible on the basis of the detection for receiving light at wider portion of the luminous flux and the tolerance quantity becomes large. Thus, the precise adjustment of the two duplex photodetectors, reduction in size of the gap, etc. are not required, whereby the decrease in size of and the integration of the optical pickup can be readily realized.

While the invention has been described in conjunction with specific embodiments thereof, it is evident that many alternatives and modifications will be apparent to those skilled in the art in light of the foregoing description.

Accordingly, it is intended to include all such alternatives and modifications as fall within the spirit and scope of the appended claims.

What is claimed is:

1. An optical head for detecting defocuses of a target, comprising:
    a substrate;
    a waveguide layer formed integrally on the substrate;
    a coupling means integrated with the waveguide layer for coupling light reflected from the target to the waveguide layer thereby to converge and waveguide the reflected light within the waveguide layer;
    two pairs of photodetectors integrated with the waveguide layer and spaced apart from each other, the photodetectors each for detecting the waveguided light; and
    a calculating means connected to the two pairs of photodetectors for calculating a focusing error signal from outputs of the two pairs of photodetectors;
    one photodetector of each pair of photodetectors being arranged in front of the other photodetector of each pair of photodetectors in a propagating direction of the waveguided light in such a manner that the one photodetector blocks off part of the waveguided light from the other photodetector when a surface of the target is in focus.

2. The optical head according to claim 1, wherein the one photodetector is located close to the focused position of the waveguided light.

3. The optical head according to claim 1, wherein one of said two pairs of photodetectors is arranged in front of the focused position of the waveguided light with respect to said propagating direction of the waveguided light and the other of said pair of photodetectors is arranged to the rear of the focused position with respect to the propagating direction, so as to receive respectively different parts of the waveguided light.

4. The optical head according to claim 1, wherein the target comprises an optical recording medium of an optical information recording and/or reproducing apparatus and wherein said optical head further includes a light source for emitting a light and a focusing means for focusing the emitted light from the light source on said optical recording medium.

* * * * *